(12) United States Patent
Stemmle et al.

(10) Patent No.: US 10,944,250 B2
(45) Date of Patent: Mar. 9, 2021

(54) METHOD FOR SETTING UP A TRANSMISSION LINK FOR ELECTRICAL ENERGY

(71) Applicant: NEXANS, Courbevoie (FR)

(72) Inventors: Mark Stemmle, Hannover (DE); Stephan Lange, Wedemark (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/309,013

(22) PCT Filed: May 31, 2017

(86) PCT No.: PCT/EP2017/063102
§ 371 (c)(1),
(2) Date: Dec. 11, 2018

(87) PCT Pub. No.: WO2017/215912
PCT Pub. Date: Dec. 21, 2017

(65) Prior Publication Data
US 2019/0260194 A1    Aug. 22, 2019

(30) Foreign Application Priority Data

Jun. 13, 2016  (EP) .................................. 16305709

(51) Int. Cl.
*H02G 15/34*  (2006.01)
*H01B 12/02*  (2006.01)
*H01B 12/16*  (2006.01)

(52) U.S. Cl.
CPC ............. *H02G 15/34* (2013.01); *H01B 12/02* (2013.01); *H01B 12/16* (2013.01); *Y02E 40/60* (2013.01)

(58) Field of Classification Search
CPC ........ H02G 15/34; H01B 12/02; H01B 12/16; Y02E 40/648
See application file for complete search history.

(56) References Cited

U.S. PATENT DOCUMENTS 1,685,636 A * 9/1928 Kemp ....................... B21C 3/16
 72/479
2,614,607 A * 10/1952 Klein ..................... B21D 15/04
 72/194

(Continued)

OTHER PUBLICATIONS

Hamabe M et al. "Cooling Cycle Test of DC Superconducting Power Transmission Cable" Journal of Physics: Conference Series, Institute of Physics Publishing, Bristol, GB Jul. 22, 2010.

(Continued)

*Primary Examiner* — Livius R. Cazan
(74) *Attorney, Agent, or Firm* — Sofer & Haroun, LLP

(57) ABSTRACT

A method is provided for setting up a transmission link for electrical energy, in which at least one superconductive cable and a cryostat surrounding the same are used, the cryostat having two metal tubes arranged concentrically in relation to one another, between which a vacuum insulation is provided. The ends of the cryostat in the assembled state as well as the superconductive cable located in the same are attached on fixed parts of the transmission link. At least at one end of the cryostat, there is gaplessly connected to the same a tube body which is bent by an angle of at least 180° and likewise consists of two metal tubes arranged concentrically in relation to one another, between which a vacuum insulation is provided. The superconductive cable protruding from the cryostat is arranged in the tube body at room temperature in such a way that it runs at least in the direct proximity of the wall of the inner tube of the tube body that has the greater bending radius.

2 Claims, 2 Drawing Sheets

(56) References Cited

U.S. PATENT DOCUMENTS

| | | |
|---|---|---|
| 2004/0255452 A1 | 12/2004 | Schippl |
| 2006/0272847 A1 | 12/2006 | Allais et al. |
| 2010/0285968 A1 | 11/2010 | Gregory |
| 2014/0038827 A1 | 2/2014 | Stemmle et al. |
| 2017/0372819 A1* | 12/2017 | Takagi .................. H01B 12/16 |

OTHER PUBLICATIONS

International Search Report dated Sep. 5, 2017.

* cited by examiner

METHOD FOR SETTING UP A TRANSMISSION LINK FOR ELECTRICAL ENERGY

This application is a National Phase Application of PCT Patent Application No. PCT/EP2017/063102 filed on May 31, 2017 which claims the benefit of priority from European Patent Application No. 16 305 709.4, filed on Jun. 13, 2016 the entirety of which is incorporated by reference.

The invention relates to a method for setting up a transmission link for electrical energy, in which at least one superconductive cable and a cryostat surrounding the same are used, the cryostat consisting of two metal tubes arranged concentrically in relation to one another, an outer tube and an inner tube, between which a vacuum insulation is provided, in which, at least one end of the cryostat, there is gaplessly connected to the same a tube body running in a bent form which likewise consists of two metal tubes arranged concentrically in relation to one another, an outer tube and an inner tube, between which a vacuum isolation is provided, in which the free end of the tube body in the assembled state as well as the superconductive cable enclosed by the same are connected to a fixed part of the transmission link and in which a coolant is passed through the cryostat to bring the cable into the superconductive state.

Such a method is disclosed for example by EP 2 693 584 A1.

Fixed parts of the transmission link may be end terminations or connecting sleeves, by which two lengths of the transmission link, consisting of a cryostat and a cable, are connected to one another. Such a cryostat consists of two tubes that are separated from one another by a spacer. As a result, they are arranged concentrically in relation to one another. The word "concentrically" also applies here to a setup of the cryostat in which the two tubes do not run exactly parallel to one another due to production inaccuracies.

A superconductive cable has at least one electrical conductor of a material which, at sufficiently low temperatures, goes over into the superconductive state. Suitable superconductive materials are, for example, oxidic materials on the basis of rare earths (ReBCO), in particular YBCO (yttrium-barium-copper oxide), or BSCCO (bismuth-strontium-calcium-copper oxide). Sufficiently low temperatures to bring such a material into the superconductive state lie for example between 67 K and 110 K. However, there are also superconductive materials, such as for example magnesium diboride, which have to be cooled down to still lower temperatures if they are to go over into the superconductive state. Suitable coolants for all of these materials are, for example, nitrogen, helium, neon and hydrogen or mixtures of these substances. During the operation of an arrangement with at least one superconductive cable, the same is therefore cooled down considerably within the cryostat—from room temperature to operating temperature—whereby it becomes shorter because of thermal contraction. In order to ensure the functional capability of the transmission link, precautions by which the shortening of the cable can be compensated must be taken.

In the case of the method according to EP 1 720 176 B1, a superconductive cable is provided in a cryostat in such a way that at room temperature it runs in the form of a wave or helix. The excess length of the cable thereby achieved with respect to the cryostat is stabilized by a cross-like network, which is connected at certain points to the cable.

EP 1 617 537 B1 discloses a method for setting up an arrangement with a superconductive cable that is laid in a cryostat and is connected to an end termination. The end termination is provided with an electrical conductor, which is fitted with a tubular component of electrically conducting material comprising radially resilient ribs, in which the conductor of the superconductive cable is incorporated in the assembled state. In the event of thermally induced changes in length, the conductor of the superconductive cable can slide in its longitudinal direction in the tubular component.

EP 2 693 584 A1, mentioned at the beginning, relates to an arrangement with at least one superconductive cable and a cryostat surrounding the same, in which there are fitted in the cryostat two bellows, between which a piece of tube running in a bent form is provided. The bellows are intended preferably to lie symmetrically in relation to the piece of tube, which for this purpose is bent by 180° or at least by approximately 180°. The cable arranged in the cryostat is cooled down during operation of the arrangement and as a result becomes shorter. It thereby comes to lie against the wall of the piece of tube and draws the same in a direction in which the bellows are pressed together.

The invention is based on the object of simplifying the method described at the beginning for setting up a transmission link for electrical energy and of improving the thermal compensation of the superconductive cable used in the same.

This object is achieved according to the invention by providing that a tube body which is bent by an angle of at least 180° and is connected to the cryostat in a fixed and sealed manner is used, that tubes that have a greater diameter than the corresponding tubes of the cryostat are used for the production of the tube body, and that the superconductive cable protruding from the cryostat is arranged in the tube body at room temperature in such a way that it runs at least in the direct proximity of the wall of the inner tube that has the greater bending radius.

The tube body may be advantageously prefabricated in a workshop in the bent form in which it is bent by an angle of at least 180°. It can then be transported as a one-part component to an assembly site and be connected there to the cryostat, surrounding the superconductive cable, of a transmission link for electrical energy. As a result of its bent form, the tube body takes up relatively little space at the assembly site. That is of advantage in particular whenever the cryostat and the cable are to be connected to a connecting sleeve that serves for connecting to a continuing cryostat with an enclosed cable, because there is generally only little space available there in a construction trench. The cable laid at least in the proximity of the wall of the inner tube of the tube body that is bent so as to correspond to the greater bending radius can move within the tube body during cooling down and the accompanying contraction. In the starting position at room temperature, it lies with the greatest bending radius "outside" in the tube body and, with corresponding shortening of its length, moves "inwards" in the tube body, that is to say in the direction of the wall of the inner tube with the smaller bending radius. In this case, the shortening of the superconductive cable in its axial direction within the cryostat is also compensated.

During its assembly in the tube body, the superconductive cable is advantageously arranged in such a way that it lies directly against the wall of the inner tube of the same that is bent with the greater bending radius. As a result, assembly is simplified and there is then the maximum space available for the movement of the cable in the tube body.

The angle by which the tube body is bent depends on the length of the transmission link. Thus, the angle of 180° applies for example to a transmission link 150 m long. In the case of a transmission link 300 m long, the angle may be for example 360°. An angle of 540° is advantageously advisable in the case of a transmission link 450 m long.

The method according to the invention is explained as an exemplary embodiment on the basis of the drawings, in which.

Figure 5:
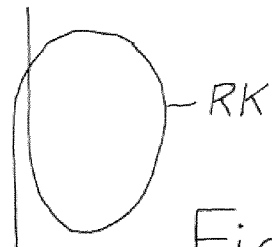
Figure 6:
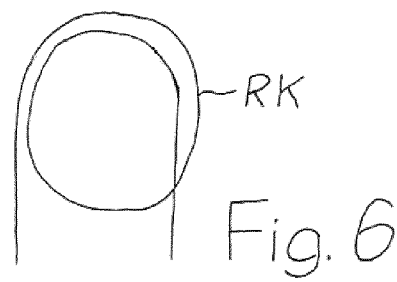

FIGS. 5 and 6 schematically show further embodiments of the tube body.

Figure 1:
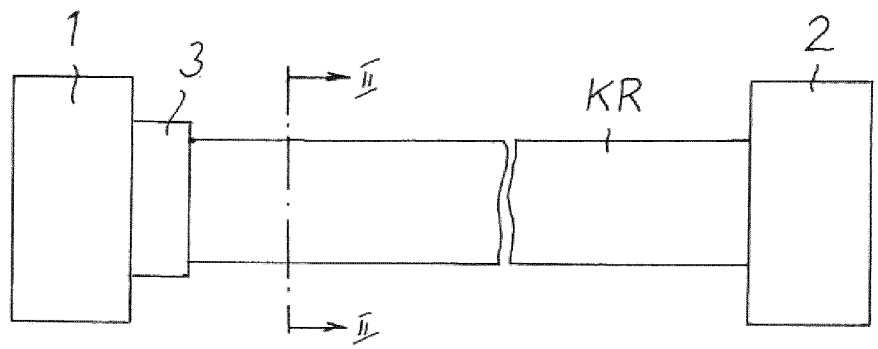
FIG. 1 shows in a schematic representation an arrangement suitable for use of the method according to the invention.
Figure 2:
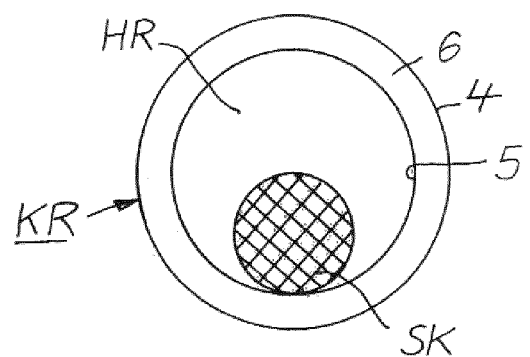
FIG. 2 shows a section through FIG. 1 along the line II-II in an enlarged representation.

In FIG. 1, two end terminations 1 and 2 are schematically represented as fixed parts of a transmission link for electrical energy. Such end terminations are known, and so their setup is not discussed any more specifically. Fixedly attached to the two end terminations 1 and 2 are a cryostat KR and a superconductive cable SK located in the same (FIG. 2). At least one of the end terminations 1 or 2 could also be a connecting sleeve. In the exemplary embodiment represented in FIG. 1, between the end termination 1 and the cryostat KR there is a tube body RK, which is indicated by a small box 3 and the setup and functioning principle of which are explained on the basis of FIGS. 3 to 6.

According to FIG. 2, the cryostat KR consists of two metal tubes arranged coaxially and at a distance in relation to one another, an outer tube 4 and an inner tube 5, between which a spacer and a vacuum insulation 6 are arranged. The tubes 4 and 5 advantageously consist of high-grade steel. They may be corrugated transversely to their longitudinal direction, and consequently able to bend well. Apart from the cable SK, the cryostat KR encloses a cavity HR, through which a coolant can be passed. The superconductive cable SK may be of any desired setup. There may also be two or more superconductive cables accommodated in the cryostat KR.

Figure 3:
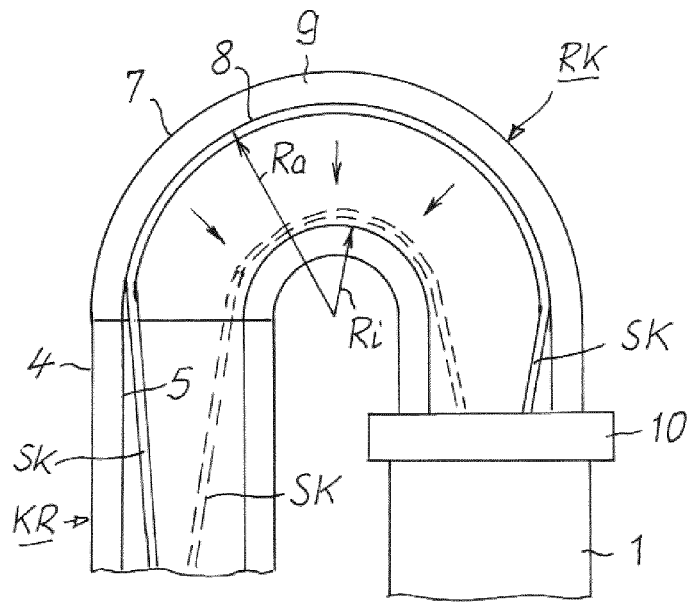
FIG. 3 shows a tube body that can be used in the arrangement as shown in FIG. 1.

Schematically represented in FIG. 3 is a tube body RK, which is bent by 180° and is connected at one end to the cryostat KR and at the other end to the end termination 1, which again is only indicated schematically. Like the cryostat KR, the tube body RK consists of two metal tubes arranged concentrically in relation to one another, an outer tube 7 and an inner tube 8. Provided between the two tubes 7 and 8 is a vacuum insulation 9. The tubes 7 and 8 advantageously consist of high-grade steel. They may be corrugated transversely to their longitudinal direction. The tubes 7 and 8 may however also be advantageously configured as smooth tubes.

In the assembly position, the outer tube 7 of the tube body RK is connected in a fixed and sealed manner to the outer tube 4 of the cryostat KR. They are for example welded to one another. By analogy thereto, this also applies to the inner tubes 8 and 5 of the tube body RK on the one hand and the cryostat KR on the other hand. The tubes 7 and 8 of the tube body RK are connected at its other end in a fixed and sealed manner, for example by way of a flange connection 10, to the end termination 1.

The method according to the invention is carried out for example as follows for the embodiment of an arrangement as shown in FIG. 3:

A cryostat KR with a length of approximately 150 m is laid along a transmission link in such a way that its one end lies in the proximity of the end termination 1. The superconductive cable SK enclosed by the cryostat KR has advantageously already been arranged in the same at the manufacturer's works in such a way that it protrudes from the same by a predetermined length. During transport of the cryostat KR to the laying site, it must be protected from mechanical damage by a suitable sheathing. The length of the protruding cable SK is dictated by the length of the tube body RK and by the length required for an end termination or a connecting sleeve.

Before the described connecting of the tube body RK and the cryostat KR, the cable SK is provided in the tube body RK. It then protrudes at the end of the tube body RK provided with the flange 10 from the same to such an extent that it can be connected to the end termination 1. In this case, the cable SK is advantageously arranged in the tube body RK in such a way that it lies against the inner tube 8 of the same, to be precise against the wall of the same that is bent with the greater bending radius Ra. In a way corresponding to FIG. 3, it then lies in the space enclosed by the tube body RK as far as possible towards the outside. In this position, the cable SK is also connected to the end termination 1. The cable SK is in any event intended to lie in the direct proximity of the mentioned wall of the inner tube 8 of the tube body RK.

After the assembly of the tube body RK with the superconductive cable SK lying therein has been completed in the way described, a coolant is passed through the cryostat KR. As a result, the cable SK is cooled down. Its length is thereby shortened by approximately 0.3%. This shortening has an effect on the one hand in the axial direction within the cryostat KR but also on the length of the cable SK that is accommodated in the tube body RK. The cable SK can move by virtue of the shortening within the tube body RK, to be precise "inwards" in the direction of the arrows depicted in FIG. 3. In a maximum achievable end position, depicted by dashed lines, it can lie against the wall of the inner tube 8 of the tube body RK that is bent with the smaller radius Ri. In this way, the space enclosed by the tube body RK is used to accept the shortening of the cable SK without the same being subjected to tensile stress.

Figure 4:
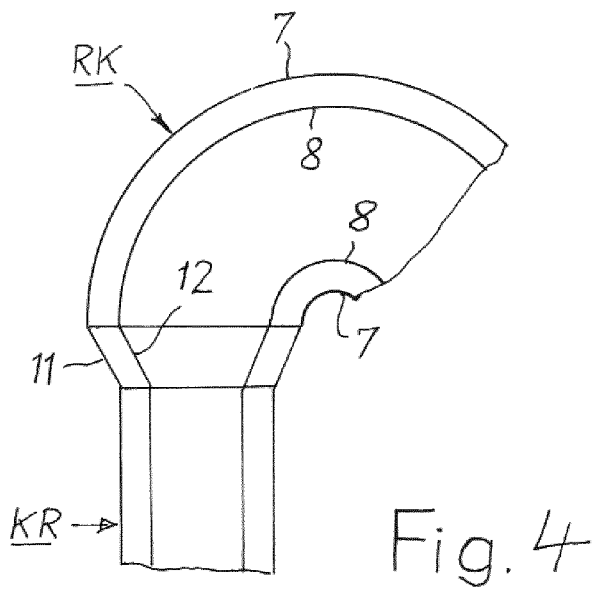
FIG. 4 shows an embodiment of a portion of the tube body modified with respect to FIG. 3.

The space enclosed by the tube body RK is increased in size by the tubes 7 and 8 from which the tube body RK is bent having a greater diameter than the corresponding tubes 4 and 5 of the cryostat KR. This is indicated in FIG. 4, in which only the transition from the cryostat KR to the tube body RK is represented. In the exemplary embodiment represented, respectively arranged between the tubes to be connected to one another are approximately conically configured transition pieces 11 and 12. The transition pieces 11 and 12 may also have a different geometrical form. In the end position, they are fixedly connected, preferably welded, to the tubes 4 and 5 of the cryostat KR and also the tubes 7 and 8 of the tube body RK.

The method according to the invention is described above for a cryostat KR 150 m long, for which a tube body RK bent by 180° is sufficient. In the case of a longer cryostat, with a correspondingly longer cable SK, the length of the tube body RK must also be extended, in order that a larger space is available for the movement of the cable SK. The tube body RK may for example be extended by a tube body bent by 90° or else by a tube body with an even multiple of 90°.

A tube body RK suitable for a cryostat KR 300 m long is for example bent by 360°. This is schematically represented in FIG. 5, in which only a line that corresponds to the tube body RK consisting of the tubes 7 and 8 is depicted. A further extended tube body RK is similarly schematically represented in FIG. 6. It is bent by 540° and can be advantageously used for a cryostat KR 450 m long.

In all of the embodiments described, the tube body RK may be put together from prefabricated parts that are respectively bent by 90°. These parts are welded to one another. This may be carried out already at a manufacturer's works, but advantageously at the assembly site.

The invention claimed is:

1. An arrangement for connecting at least one superconductive cable and a cryostat surrounding the superconductive cable to at least one end termination of a transmission link, where the cryostat has an outer metal tube and an inner metal tube arranged concentrically, between which a vacuum insulation is provided, said cryostat further having a coolant therein, wherein said arrangement comprises:

a bent tube body having a metal outer tube and a metal inner tube, between which a vacuum insulation is provided, a first end of the tube body, and said superconductive cable, which is enclosed by the tube body, are connected to said at least one end termination of said transmission link, wherein said tube body is bent at an angle of at least 180° and is connected at a second end to the cryostat in a fixed and sealed manner, wherein said metal inner tube and said metal outer tube of said tube body have a greater diameter than corresponding inner and outer metal tubes of the cryostat, wherein said tube body has dimensions such that at room temperature the superconductive cable, at the location where it extends from the cryostat into the tube body, is directly proximate the wall of the metal inner tube of said tube body which has a greater bending radius, and wherein said tube body has dimensions such that at cooling operating temperature the superconductive cable, at the location where it extends from the cryostat into the tube body, is directly proximate the wall of the metal inner tube of said tube body which has a smaller bending radius.

2. The arrangement according to claim 1, wherein the tube body is a prefabricated element, separate from said cryostat.

* * * * *